United States Patent [19]

Platte et al.

[11] Patent Number: 4,864,409
[45] Date of Patent: Sep. 5, 1989

[54] TELEVISION CAMERA ACCELERATION COMPENSATION APPARATUS

[75] Inventors: Hans-Joachim Platte, Hemmingen; Heinz-Werner Keesen, Hanover; Martin Plantholt, Hemmingen; Herbert Schütze; Dieter Haupt, both of Hanover, all of Fed. Rep. of Germany

[73] Assignee: Deutsche Thomson-Brandt GmbH, Villingen-Schwenningen, Fed. Rep. of Germany

[21] Appl. No.: 146,189

[22] Filed: Jan. 20, 1988

[30] Foreign Application Priority Data

Oct. 2, 1987 [EP] European Pat. Off. ........ 87114377.2

[51] Int. Cl.⁴ ............................................. H04N 5/228
[52] U.S. Cl. ................................................. 358/222
[58] Field of Search ............................. 358/222, 105

[56] References Cited

U.S. PATENT DOCUMENTS

| 3,536,824 | 10/1970 | Chmillon | 358/222 |
| 4,410,914 | 10/1983 | Siau | 358/222 |
| 4,476,494 | 10/1984 | Tugayé358 | 222/ |
| 4,612,575 | 9/1986 | Ishman et al. | 358/160 |
| 4,717,958 | 1/1988 | Gal et al. | 358/222 |

FOREIGN PATENT DOCUMENTS 2426753 12/1974 Fed. Rep. of Germany .
2937284 9/1979 Fed. Rep. of Germany .
3243486 11/1982 Fed. Rep. of Germany .

Primary Examiner—Jin F. Ng
Assistant Examiner—Stephen Brinich
Attorney, Agent, or Firm—Spencer & Frank

[57] ABSTRACT

A television camera includes an acceleration correction device for correcting for sudden movements of the camera, to prevent blurring of the resulting television picture. The correction device changes the starting point on an image target depending upon the amount and direction of the acceleration. This correction does not occur until the acceleration exceeds a threshold value.

7 Claims, 1 Drawing Sheet

FIG. 1b  $+\Delta X$

FIG. 1c  $-\Delta X, +\Delta Y$

4,864,409

TELEVISION CAMERA ACCELERATION COMPENSATION APPARATUS

BACKGROUND OF THE INVENTION

Television cameras include, inter alia, a camera housing, an objective lens and a memory board, hereinafter called a target, which is provided to generate the video signal. By means of the optical system, an image field is generated on the target from which the video signal is generated by scanning with an electron beam or other scanning according to a television raster.

In practice, there exists the danger, particularly for small, portable cameras, that the picture is adversely influenced by strong, inadvertent acceleration of the camera housing, i.e. the picture is blurred. This means that, for example, the desired field partially leaves the target area and parts of the desired picture are temporarily lost.

Such blurring can be substantially eliminated or reduced by placing the camera housing onto a tripod or by accessories with which the camera is carried on the body. However, in practice such means cannot always be employed or are often insufficient.

SUMMARY OF THE INVENTION

It is the object of the invention to reduce in a television camera the effects of undesirable, strong accelerations of the camera housing on the video signal generated by the camera.

This is accomplished by the invention in which a television camera includes a target on which a desired image field is projected by an optical system, in which the target is larger than the field, and a correcting variable is derived from movement of the camera to permit shifting of the starting point of the scanning raster on the target.

According to the invention, the camera detects and measures a strong, inadvertent acceleration of the camera housing and converts it to an electrical correcting variable. This correcting variable acts on the position of the scanning raster on the target in such a manner that the movement of the field caused by the inadvertent acceleration is compensated in the two orthogonal directions in the plane of the target. Detection of the strong acceleration of the camera housing is also possible in that the signals generated by the camera for two frames which are successive in time are compared. If the difference between these signals or a part thereof exceeds a certain threshold value, this can be considered to be an indication that undesired acceleration exists. Preferably, a threshold value is introduced in the path of the correcting variable to differentiate between inadvertent strong accelerations and movement of the camera housing which cause blurring and the desired, slower accelerations and movements during a panning process while shooting a particular scene. It is also possible to initially feed the signal for a frame furnished by the camera into a memory and to use it only if no blurring has been recorded during scanning of the field on the target. As soon as blurring is recorded during the scanning of a field, the entire frame is not used but replaced by a stored frame from a preceding time section. The thus produced slight influence on the motion phase is less annoying than a completely blurred image.

BRIEF DESCRIPTION OF THE DRAWINGS

The invention will be described below with reference to the drawing figures. It is shown in:

FIGS. 1A-1C the position of the field on the target;

DETAILED DESCRIPTION OF THE PREFERRED EMBODIMENT

Figure 1A:
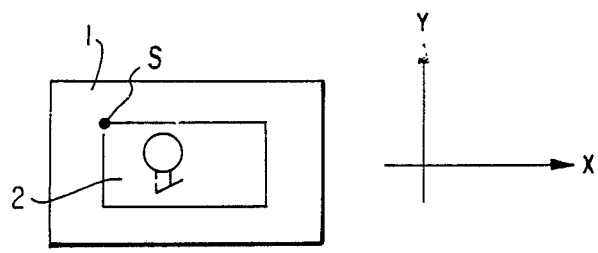

In FIG. 1A, a section of an image is reproduced on a target 1 by the objective lens of the camera. The entire target 1 is homogeneous and suitable for producing a video signal. However, the target 1 is scanned line by line in the form of a television raster only over the area of the desired field 2 with a starting point S being disposed at the upper left-hand edge of the frame. The region of the frame between the outer edge of field 2 and the edge of target 1 is thus not scanned and is not utilized to generate the video signal. The generated video signal thus represents only a section of field 2. The two orthogonal directions in the plane of target 1 are indicated by arrows x and y in FIG. 1. The data for x and y coordinates thus indicates the position of the field 2 within target 1.

In FIG. 1B, blurring caused by sudden, inadvertent shifting of the camera housing and thus of target 1 has shifted field 2 on target 1 in the positive x direction. This shift is detected and correspondingly the starting point S of the raster deflection is shifted by an amount $+\Delta x$ so that, in spite of the blurring, scanning of target 1 again begins at a point S', i.e. at the beginning of the desired field 2. The blurring caused by the camera housing thus does not influence the generated video signal. In spite of the blurring, the video signal again represents precisely the image of the shifted field 2.

In FIG. 1C, blurring has caused field 2 on target 1 to be shifted in the negative x direction and in the positive y direction. Accordingly, a starting point S'' for the raster-type scanning of target 1 is also shifted. Thus, in all cases the desired field 2 is always scanned beginning at a starting point of the frame independently of the direction and the degree of blurring.

Figure 2:
FIG. 2, the principle of a circuit according to the invention.
Figure 2:
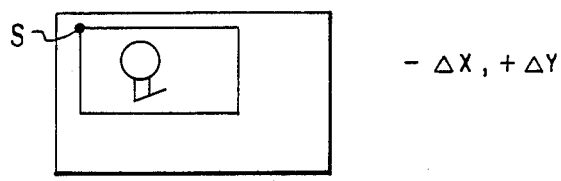
Figure 2:
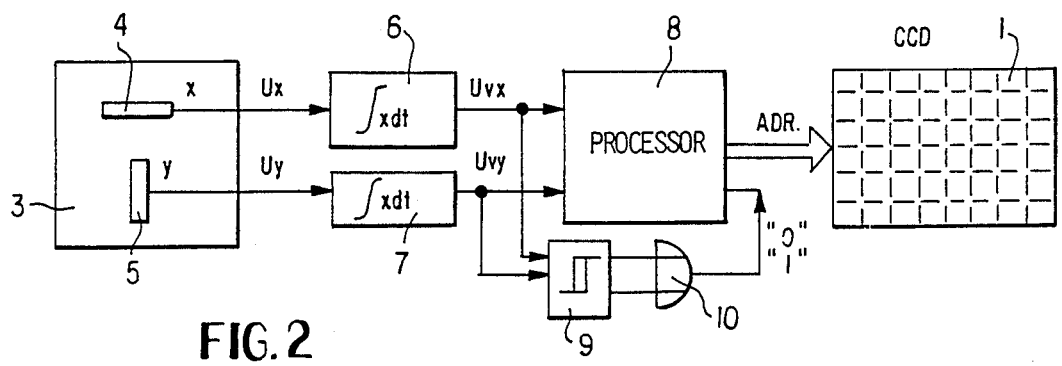

In FIG. 2, camera housing 3 includes an acceleration sensor 4 for direction x and an acceleration sensor 5 for direction y. These sensors furnish the following voltages which indicate the acceleration of housing 3 in the two directions x and y:

$$Ux \sim d^2x/dt^2$$

and $$Uy \sim d^2y/dt^2.$$

and

These voltages are converted in integrators 6 and 7 by mathematical integration into voltages which represent the velocity of the movement of camera housing 3:

$$Uvx = dx/dt \cdot K_1$$

$$Uvy = dy/dt \cdot K_2$$

where $K_1$ and $K_2$ are proportionality constants.

These voltages are fed to a processor 8. The processor 8 generates an address signal Adr therefrom which represents a motion vector according to amount and direction. On a target 1 configured as a CCD or charge coupled device circuit, this address signal Adr controls the starting point S of the scanning raster of a field 2 in the manner described in FIG. 1.

The voltages from the outputs of integrators 6 and 7 are also fed to a threshold circuit 9 which feeds voltages to an OR stage 10 only when they are above a threshold value. If there is an intentional pivoting movement of camera 3, i.e. low acceleration and velocity values, stage 10 generates a voltage of the value "0", which blocks processor 8. No address signal then appears at the output because there is no inadvertent sudden movement and thus no correction is required. If one or both voltages at the input of threshold circuit 9 exceeds the threshold value and thus an inadvertent, strong acceleration of housing 3 is recorded, the voltage at the output of stage 10 goes to "1" and activates processor 8 in the described manner.

Figure 3:
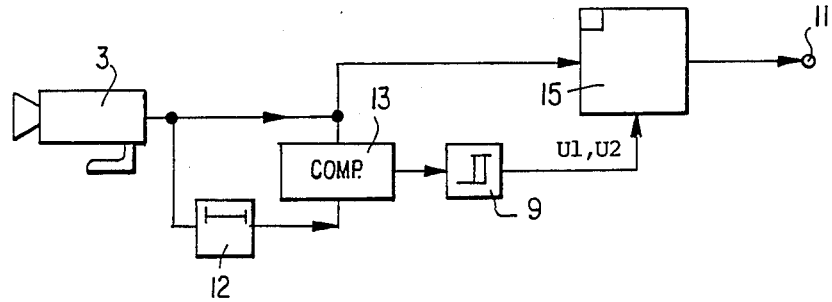
FIG. 3, a modification of the circuit according to FIG. 2.

FIG. 3 shows two modifications of the arrangement according to FIG. 2. Initially, mechanical acceleration sensors 4 and 5 are replaced by an electronic circuit. The signal of a frame is conducted to a comparator 13 for the duration of a frame, once directly and once via a delay stage 12 . Comparator 13 compares the signals from two or more frames successive in time or of defined portions or excerpts of the frames. During normal operation including intentional panning movement, this difference does not exceed a threshold value. If there is an inadvertent sudden movement, i.e. shaking of housing 3, this threshold value is exceeded. In this way, threshold circuit 9 again generates a correcting variable Us which indicates blurring.

The second modification is as follows: the frames furnished by camera 3 are initially fed to memory 15, which is able to store the signals of about two to three frames. During scanning of one frame, the generated video signal is initially not fed to the output terminal 11 but is stored in memory 15. If at the end of scanning of a frame, no inadvertent movement of camera 3, i.e. no blurring has been recorded, a voltage U1 appears which causes the stored video signal for this frame to be read out so that this signal appears at terminal 11. If during scanning of the frame blurring is recorded independently of the moment in time within the frame, a voltage U2 appears. This voltage U2 causes the signal of an image subjected to blurring not to be used. Instead the signal of a prior frame in time without blurring, which had previously been stored in memory 15, is read out and fed to terminal 11. Interfered-with frames in which circuit 9 and 13 has recorded blurring, are thus not utilized and replaced by frames from a prior time period which are not interfered with.

The correction variable or the address signal at the output of processor 8 includes, for example, a new starting address for starting point S for raster scanning a field in CCD arrays. The output voltage of the processor may also be an analog correction voltage for a camera operating with tubes. The comparison of the signals of successive frames, which occurs in comparator 13 of FIG. 3, may also extend to certain selected image regions. In this case it is possible to make a comparison over a plurality of successive frames, a so-called two-dimensional autocorrelation. With such a solution it is also possible to determine a motion vector, i.e. a correcting variable or an address voltage which indicates the degree and direction of the inadvertent movement of camera 3 and displaces starting point accordingly.

We claim:

1. In a television camera including a target on which a desired image field is projected by means of an optical system and which is scanned from a starting point on the target along a raster in order to produce a video signal, the improvement comprising:

a target which is larger than the field, and means for producing a correcting variable representing acceleration of the camera and for causing shifting of the starting point of the scanning raster on the target when the acceleration exceeds a predetermined value.

2. Camera according to claim 1, wherein said means for producing a correcting variable further comprises two acceleration sensors mounted on the camera for detecting acceleration in two orthogonal directions in the target plane, said two acceleration sensors producing respective output voltages, and two integrators which respectively receive the output voltages of said two accelerators, said two integrators having respective output signals which represent velocities, said output signals of said two comparators being used to obtain the correcting variable.

3. Camera according to claim 1, further comprising two integrators which produce corresponding output signals, and a threshold circuit which receives said output signals of said two integrators for preventing shifting of the starting point when said output signals of said two integrators is below said predetermined value.

4. Camera according to claim 1, further comprising means for providing a signal from a preceding frame in response to occurrence of said correcting variable, whereby the signal of the frame just being scanned is not used and is replaced by the signal of the preceding frame.

5. Camera according to claim 4, wherein said means for providing a signal from a preceding frame further comprises a memory means for storing frame signals from the camera, whereby a frame is read out and used only if no sudden movement was recorded during scanning of the frame, otherwise the frame is replaced by the preceding frame.

6. Camera according to claim 1, further comprising means for comparing signals of successive frames or frame portions and generates the correcting variable if the difference between the signals of the successive frames lies above said predetermine value.

7. Camera according to claim 1, wherein said means for producing a correcting variable includes a plurality of acceleration sensors to detect acceleration of the camera and which produce an output signal which is used to determine the correcting variable.

* * * * *